United States Patent [19]

Takagi

[11] Patent Number: 4,627,699
[45] Date of Patent: Dec. 9, 1986

[54] AUTOMATIC FOCUSING ADAPTOR FOR CAMERA LENS

[75] Inventor: Tadao Takagi, Yokohama, Japan

[73] Assignee: Nippon Kogaku K. K., Tokyo, Japan

[21] Appl. No.: 694,320

[22] Filed: Jan. 24, 1985

[30] Foreign Application Priority Data

Jan. 31, 1984 [JP] Japan ................................ 59-15510
Mar. 29, 1984 [JP] Japan ................................ 59-61697
Apr. 19, 1984 [JP] Japan ................................ 59-79063

[51] Int. Cl.[4] ............................................. G03B 3/00
[52] U.S. Cl. ................................ 354/400; 354/195.12
[58] Field of Search ............................ 354/400–409, 354/195.1, 195.12, 195.13, 286, 295; 350/255, 257

[56] References Cited

U.S. PATENT DOCUMENTS 4,456,356  6/1984  Okobe ............................ 354/195.13

FOREIGN PATENT DOCUMENTS 28133   3/1979  Japan .
168023 10/1983  Japan .

Primary Examiner—William B. Perkey
Attorney, Agent, or Firm—Shapiro and Shapiro

[57] ABSTRACT

According to the apparatus of the present invention, an automatic focusing unit is supplied. This unit, disposed between the camera body and the photographing lens, cooperates with the photographing lens to form an image of an object on the focal plane. Since all members and mechanisms (e.g. lens system driving mechanism) required for the apparatus have an extremely efficient arrangement, excellent operability is realized.

10 Claims, 8 Drawing Figures

AUTOMATIC FOCUSING ADAPTOR FOR CAMERA LENS

BACKGROUND OF THE INVENTION

1. Field of the Invention

The present invention relates to a camera accessory to be used in a lens exchangeable type camera system, between the camera body and the photographing lens. More particularly, the present invention relates to an optical unit provided with a lens system cooperative with the photographing lens to form an image-forming system and capable of focusing the image-forming system on an object by its own movement in the direction along the optical axis.

2. Description of the Prior Art

As a camera accessory there is known in the art an optical unit which is adaptable for a lens exchangeable type camera system and can be incorporated in between the camera body and the photographing lens in order to change over the optical property proper to the photographing lens to another desired optical property. An example of such camera accessory is a conversion lens unit which is cooperative with a photographing lens to form a composite image-forming system having a focal length different from the focal length of the photographing lens itself.

In the conversion lens unit according to the prior art, an optical system is contained in a lens assembly having two mount parts formed at the opposite ends thereof, one for the connection with a camera body and the other for the connection with a photographing lens.

Recently, in connection with the above conversion lens unit, there has been developed a novel technique which enables the focusing of the composite image-forming system by moving the optical system of the conversion lens unit in the direction of the optical axis within the lens assembly according to the so-called rear-focusing principle.

Furthermore, the specification of Japanese Patent Application laid open No. 28,133/1979 has disclosed an automatic focusing unit (generally called AF unit in brief) which has not only an optical system but also a focus detector and means for driving the optical system contained in the lens assembly. With this prior art unit automatic focusing is possible.

Lately, Japanese Patent Application laid open No. 168,023/1983 has disclosed such an AF unit provided with an optical system and means for driving it in which automatic focusing is achieved by receiving a focus detection signal from the camera body and moving the optical system in accordance with the detection signal.

In designing practical acceptable camera accessories on the basis of the above-mentioned prior art, however, particular considerations and inventive ideas are required with respect to the arrangement of various components and members in and outside of the AF unit, the contour of the unit and the location of various operation buttons and switches. Otherwise, the common desire of easy handling and easy operation can not be satisfied. The AF unit obtained may involve many difficulties in mounting on a camera body as well as in operation for taking pictures.

SUMMARY OF THE INVENTION

Accordingly the principal object of the invention is to provide an automatic focusing unit in which inner and outer members and mechanisms required for automatic focusing are arranged in a functionally best manner for realizing the desired highest operability.

Other and further objects, features and advantages of the invention will appear more fully from the following description taken in connection with the accompanying drawings.

DESCRIPTION OF PREFERRED EMBODIMENTS

Figure 1:
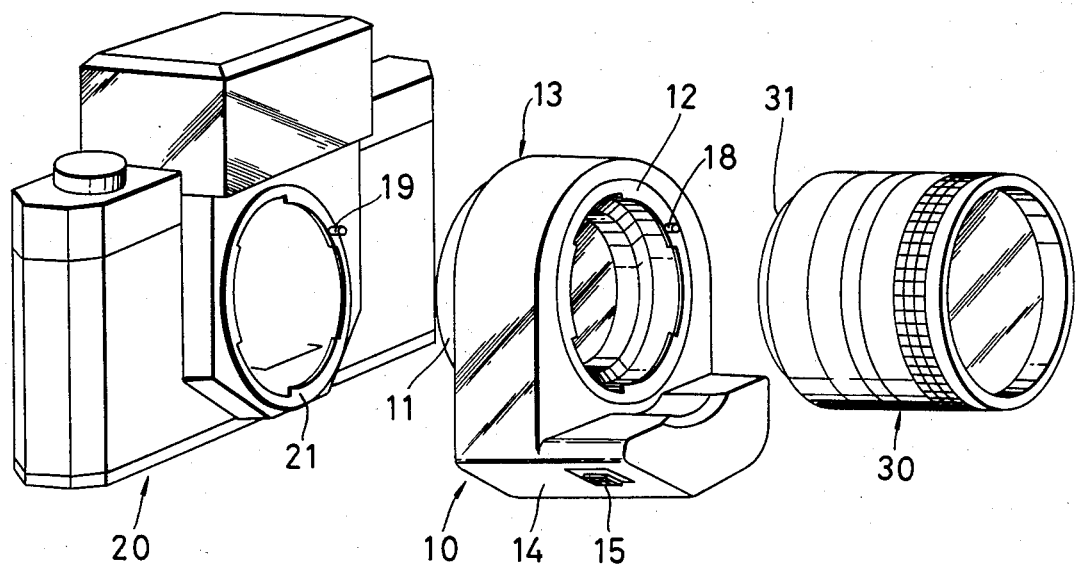
FIG. 1 is a perspective view showing an AF unit according to an embodiment of the invention, a camera body and a photographing lens before coupling.

Referring first to FIG. 1 showing the manner of mounting an automatic foucsing unit on a camera body, the automatic focusing (AF) unit in which the present invention has been embodied is generally designated by 10.

The AF unit 10 is mounted in between a camera body 20 and a photographing lens 30. To this end, the AF unit 10 has a mount member 11 provided on one end which is engageable with a bayonet mount member 21 on the camera body. On the other end side the AF unit has another mount member 12 engageable with a bayonet mount member 31 on the photographing lens. In structure, the mount members 11 and 31 are substantially the same and the mount members 12 and 21 are substantially the same. In the vicinity of the mount member 12 the AF unit 10 has a signal pin 18 for transmitting information concerning the type of the photographing lens 30 to the camera body. Although not shown in FIG. 1, the lens 30 has a signal member which can push the signal pin 18 in the direction of the optical axis for slide-movement of the signal pin by which a pin 19 on the camera body can be slide-moved.

The camera body 20 has a known photographing mechanism, a known focus detector and a power source arranged in the body. Near the mount member 21 the camera body has also a group of electric contacts not shown to which a detection signal and an electric voltage or current are applied. The detection signal from the focus detector contains information concerning direction as well as magnitude of the existing deviation of the object image from the focal plane. Near the mount member 11 the AF unit 10 has a group of electric contacts mating with the electric contact group on the mount member 21 of the camera body. When the mount members 11 and 21 are coupled together perfectly, the electrical connection between the electric contact groups is completed. Through the electric contact groups the detection signal is transmitted to the AF unit 10 and introduced into an electric circuit within the unit 10.

The AF unit 10 comprises a casing 13 having a cylindrical chamber and a trapezoidal chamber lying under the cylindrical chamber. The cylindrical chamber contains therein a conversion lens system and the trapezoidal chamber contains an electric circuit and a driving system. The contour of the casing 13 is defined by an upper cylindrical column part and a lower prismoidal part extending along the optical axis. The lower prismoidal part has an extension toward the object side (the side of the photographing lens 30) beyond the end of the upper cylindrical part.

The cross-sectional form of the lower prismoidal part taken along a plane normal to the optical axis is approximately trapezoidal to provide inclined surface 14 facing downward. On the inclined surface 14 there is provided an operation button 15 in the area of the above-mentioned extension. The operation button 15 is formed as a so-called focus-locking device which is manually operated by the cameraman to lock the electric circuit and/or the driving mechanism, thereby locking the lens system against movement within the unit 10. The operation button 15 is used during the operation for taking a picture while viewing the object field through the viewfinder of the camera. At the operation time, the cameraman is usually holding the camera with his left hand. Therefore it is desirable for the operation button to be positioned at a position easily accessible to one or more fingers of the left hand while holding the camera.

Figure 2:
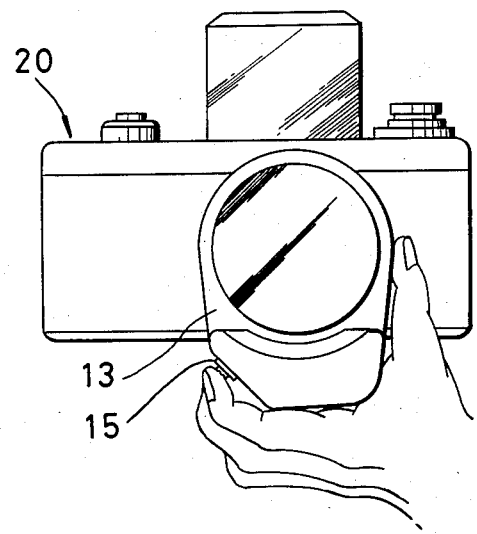
FIG. 2 is a front view of the camera with the AF unit mounted thereon showing a posture for the operation of the camera.
Figure 3:
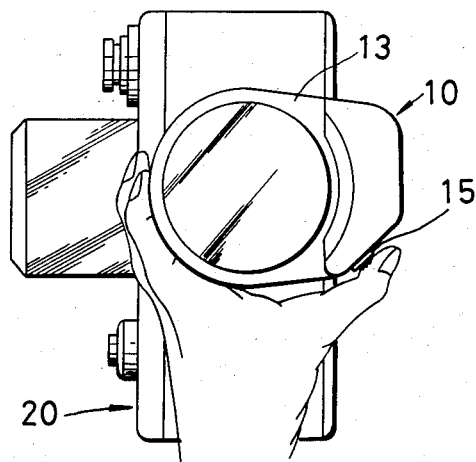
FIG. 3 is a view similar to FIG. 2 showing the camera in another posture vertically held.

In the shown embodiment, as seen from FIGS. 2 and 3, the selected position on the inclined surface 14 for the operation button 15 is very suitable for operation. The operation button 15 is below the optical axis off to the left as viewed in the direction toward the camera from the object field side. When the cameraman takes a picture while holding the camera horizontally with his left hand as shown in FIG. 2, he can easily touch the operation button 15 with the forefinger, middle finger or third finger of the left hand. The palm of the left hand can support the bottom of the casing 13 in a well-balanced manner.

When the cameraman takes a picture while holding the camera vertically as shown in FIG. 3, he can easily touch the operation button 15 with the thumb of the left hand grasping the cylindrical part of the casing 13. The selected position of the operation button in this embodiment, therefore, assures always easy operation of the camera regardless of the posture of the camera during picture-taking.

Figure 4:
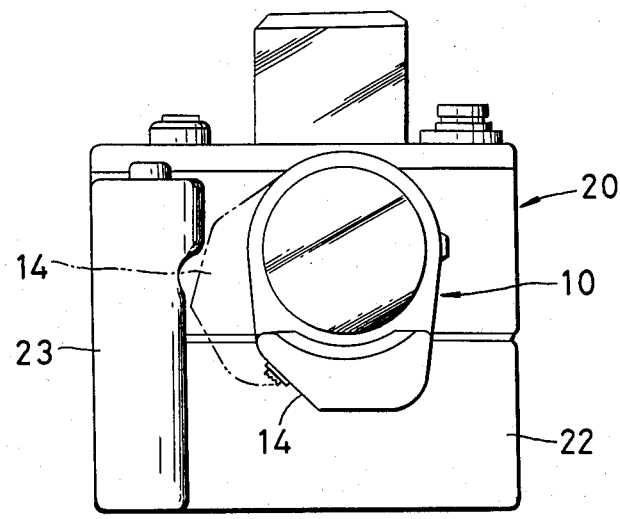
FIG. 4 is a front view of a camera with the AF unit and a motor drive unit mounted thereon together.

The AF unit 10 can be mounted also on a camera body that is provided with a motor drive 22 having a grip 23 as shown in FIG. 4. In mounting there occurs no mechanical interference between the grip 23 on the camera body and the prismoidal lower part of the unit 10. The inclined surface 14 of the lower portion of the unit 10 serves to avoid such interference. As previously mentioned, the camera body and the AF unit are coupled together by means of bayonet mount members 11 and 21. The coupling is achieved by rotating the casing of the unit 10 counter-clockwise by a determined rotational angle from the position suggested by the broken line to the position indicated by the solid line in FIG. 4. At this step, because of the presence of the inclined surface 14, the casing can be rotated without conflict with the grip 23 of the camera body.

Figure 5:
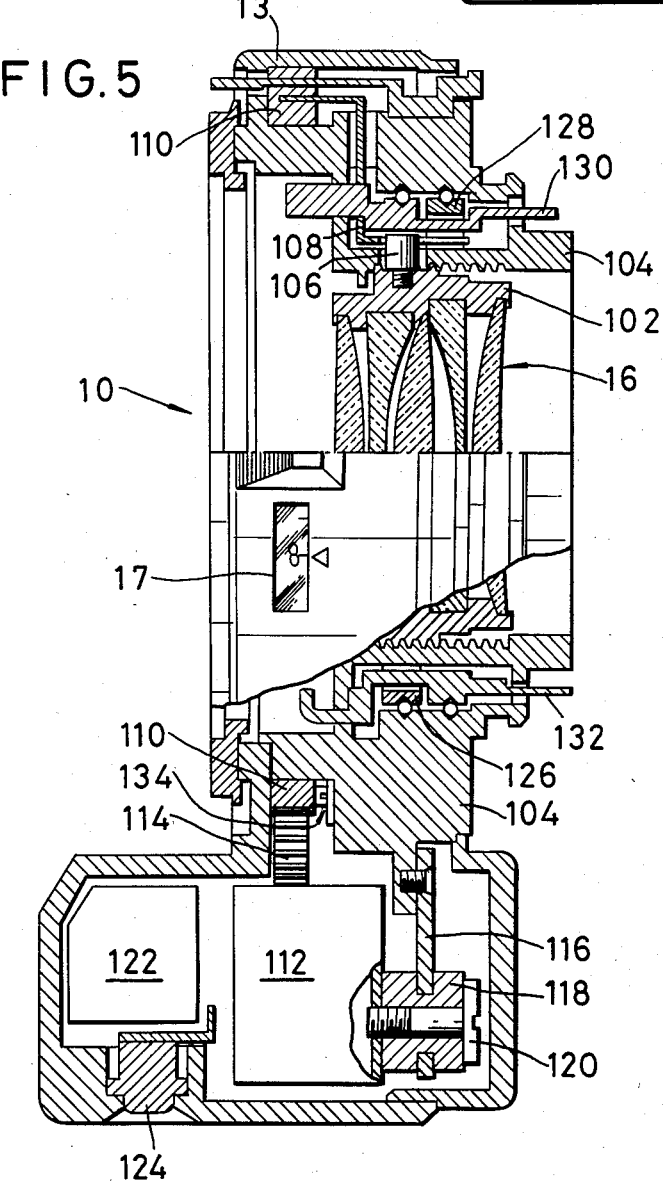
FIG. 5 is a sectional side view of the AF unit.

FIG. 5 shows the detailed structure within the AF unit 10.

As previously mentioned, a conversion lens system 16 is arranged in the cylindrical chamber of the casing 13. The lens system 16 is composed of five lens groups the total power of which is negative. The lens system 16 is supported by a ring 102 which is in turn in thread-engagement with the inner surface of a stationary cylinder 104 through a helicoid. When the ring is rotated within the cylinder 104, the ring and, therefore, the lens system 16 move in the direction along the optical axis a distance corresponding to the pitch of the helicoid.

The ring 102 has a stud pin 106 passing through a spiral slot on the cylinder 104. A driving lever 108 holds the top end of the pin 106. The lever 108 is fixed to a geared ring 110 mounted on the cylinder 104 for rotation about the optical axis. With the rotation of the geared ring 110, therefore, the pin 106 moves in the direction along the optical axis while rotating about the optical axis at the same time.

The geared ring 110 is driven by a driving unit 112 through a gear 114. The driving unit 112 is contained in the lower trapezoidal chamber of the casing 13. The driving unit is fixed to a plate 116 through antivibration rubber 118 by a set screw 120. The plate 116 is fixed to the cylinder 104.

The driving unit 112 contains a motor, a reduction gear train etc. a detailed description of which will be made later.

Within the trapezoidal chamber there is also an electric circuit 122 for controlling the driving of the motor. ON-OFF contol of the power supply to the electric circuit is effected by a slide switch 124.

Outside of the lens system 16 there are two rings 126 and 128 rotatably mounted along the inner circumferential surface of the cylinder 104 through ball bearings. Levers 130 and 132 are fixed to the rings 126 and 128 respectively. The lever 130 is disposed between an automatic diaphragm driving mechanism in the camera body and a diaphragm mechanism in the photographing lens to link the two mechanisms with each other. The other lever 132 is disposed to transmit to the camera body a signal as to the position of a signal member, the signal representing the F-number of the maximum aperture of the photographing lens. To this end, the lever 132 is rotated by a determined amount during the coupling of the photographing lens and the AF unit.

To limit the moving range of the lens system 16 there is provided a limit switch 134 constituted of a conductive brush fixed on the geared ring 110 and an electrode fixed on the cylinder 104.

Figure 6:
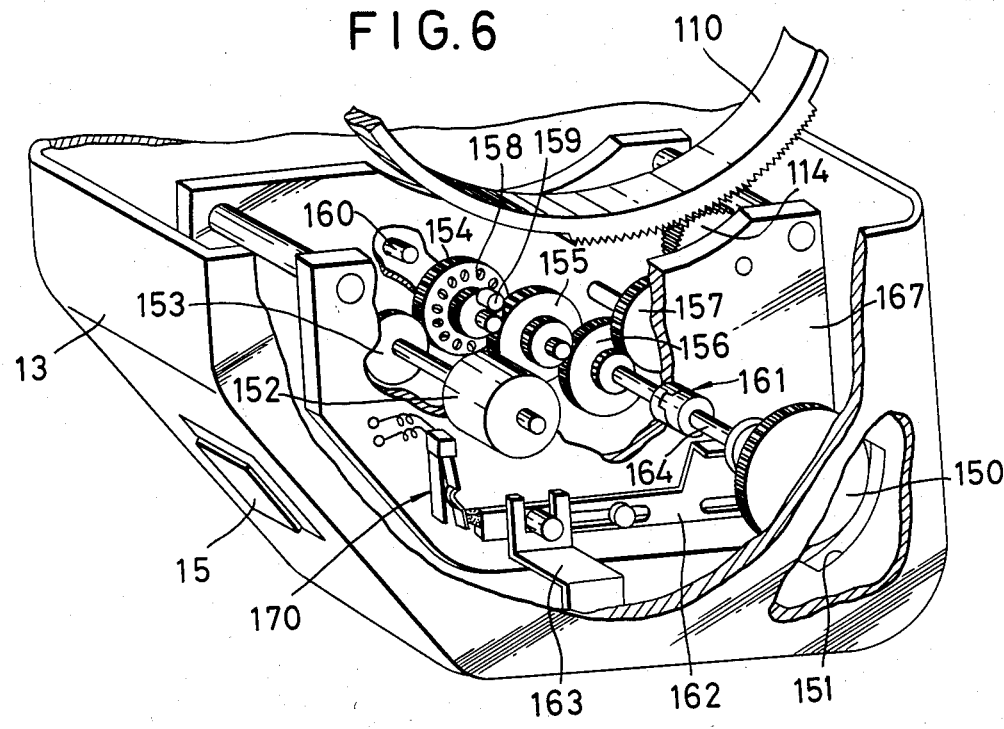
FIG. 6 is a perspective view showing the driving mechanism of the AF unit.

FIG. 6 shows the detailed arrangement of members in the driving unit 112.

An opening 151 is formed in the bottom of the trapezoidal chamber so as to allow an operation dial 150 to be externally operated. 152 is an electric motor having a driving shaft connected with a reduction gear train including gears 153-157. Through the gear train and a gear 114 the rotation of the driving shaft is transmitted to the geared ring 110. A photo diode 159 and a photo transistor 160 are disposed opposed to each other with the gear 154 interposed therebetween. The gear has a number of through-holes 158 regularly arranged concentrically about the rotation axis of the gear.

On the outer circumferential surface of the geared ring 110 there is marked a scale to indicate the position of the lens system 16 in the direction along the optical axis. One can read the scale mark through a window 17 in the casing 13 (FIG. 5).

Figure 7:
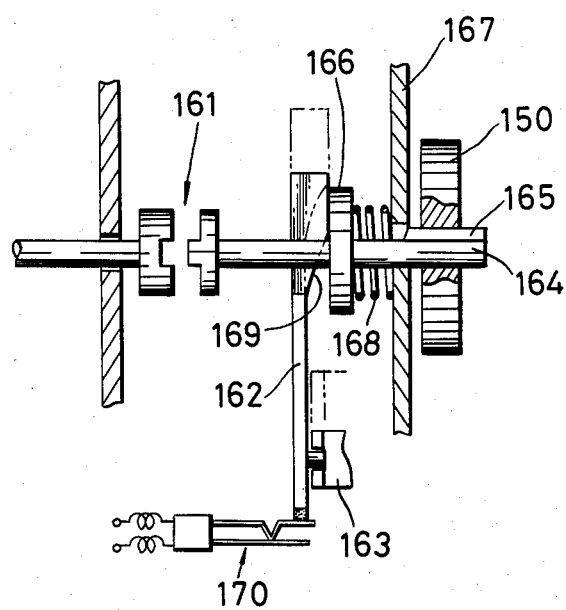
FIG. 7 is a plan view showing clutch means of the driving mechanism.

The dial 150 and the gear 156 are coaxially connected through a clutch 161. The clutch is actuated interlocking with a lever 162 which is in turn slide-moved by an arm 163. The arm 163 is moved together with the slide switch 124 shown in FIG. 5. As clearly seen in FIG. 7, the operation dial 150 is mounted on a shaft 164 for slide movement along the length of the shaft but against rotation relative to the shaft by a key 165. As for the rotational movement, the dial 150 and the shaft 164 move together.

The shaft 164 has a disk 166 fixedly mounted thereon at the middle of the length of the shaft. 167 is a base plate fixed in the casing. A biasing spring 168 is disposed between the disk 166 and the fixed base plate 167. The lever 162 has a tapered portion 169. When the arm 163 is moved by the slide switch 124, the lever 162 slides to a position suggested by the phantom line to allow the disk 166 to move following the tapered portion 169 of the lever. As a result, the clutch 161 is coupled so that manual focusing is possible by turning the dial 150. The manual rotation of the dial is transmitted to the geared ring 110 through the gear train to move the lens system.

In order to link the ON-OFF control of the power supply circuit of the motor with the clutch-in and clutch-out action of the clutch 161, there is provided a switch 170 which is closed and opened by the lever 162. In the position of the clutch 161 shown in FIG. 6 in which the dial 150 and the gear train are coupled through the clutch, the switch 170 is open and consequently the power supply circuit for the motor in the electric circuit 122 is opened. In the position shown in FIG. 7 in which the gear train is disconnected from the dial 150, the switch 170 is closed to permit the power supply to the motor 152. Therefore, in this position, the lens system can be moved by the motor 152 for automatic focusing.

In taking a picture, the focusing detector in the camera body 20 forms a detection signal from the state of the object image formed on a predetermined plane through the lens systems of the photographing lens 30 and the AF unit 10. The electric circuit 122 receives the detection signal through the electric contact group and drives the motor 152 to move the lens system 16 in accordance with the detected deviation of the object image from focus. The moved distance of the lens system is converted into a series of pulses formed by the photo diode 159 and photo sensor 160 arranged on the opposite sides of the gear 154. The pulses are introduced into a control circuit in the electric circuit. In the control circuit, the distance represented by the pulses and the deviation represented by the detection signal from the camera body are compared with each other. When the two values become equal to each other or get into a predetermined relation, the motor is stopped.

As previously described, the operation dial 150 is used for manual focusing. But, the dial 150 may be used also for the following purpose:

The lens system of the photographing lens 30 and the lens system of the AF unit 10 form a composite lens system. The focusing of the composite lens system may be achieved, as a matter of course, even by moving the lens system of the photographing lens 30 only. However, in this case, it is necessary for the lens system 16 of the AF unit to be kept stationary at the position for infinity. If the lens system 16 is in any other unsuitable position, it is impossible to focus the composite lens system on an object at infinity or at a long object distance, however hard the cameraman may try to focus by moving the focusing ring of the photographing lens.

As previously described, the lens system 16 of the AF unit is automatically moved by a motor and stopped at an in-focus position. However, this stop position of the lens system 16 is not always the position suitable for focusing by the photographing lens. This problem can be solved by using the manual operation dial 150. So, it is possible to move the lens system 16 up to the position for infinity by the manual dial 150 prior to focusing by the photographing lens 30.

The focusing by the photographing lens as mentioned above may be needed also in case of an emergency such as voltage drop of the power source or when the AF unit is used in combination with a camera body provided with no focus detector. The latter case is most likely to occur. In such case, it is desirable that when the AF unit is mounted on the camera body, the lens system 16 of the AF unit can automatically be set to the position for infinity without need of manual operation of the dial 150. The convenience to the cameraman may be improved very much if the lens system 16 is always automatically set to the position for infinity in response to attachment or detachment of the AF unit to or from the camera body or photographing lens.

Figure 8:
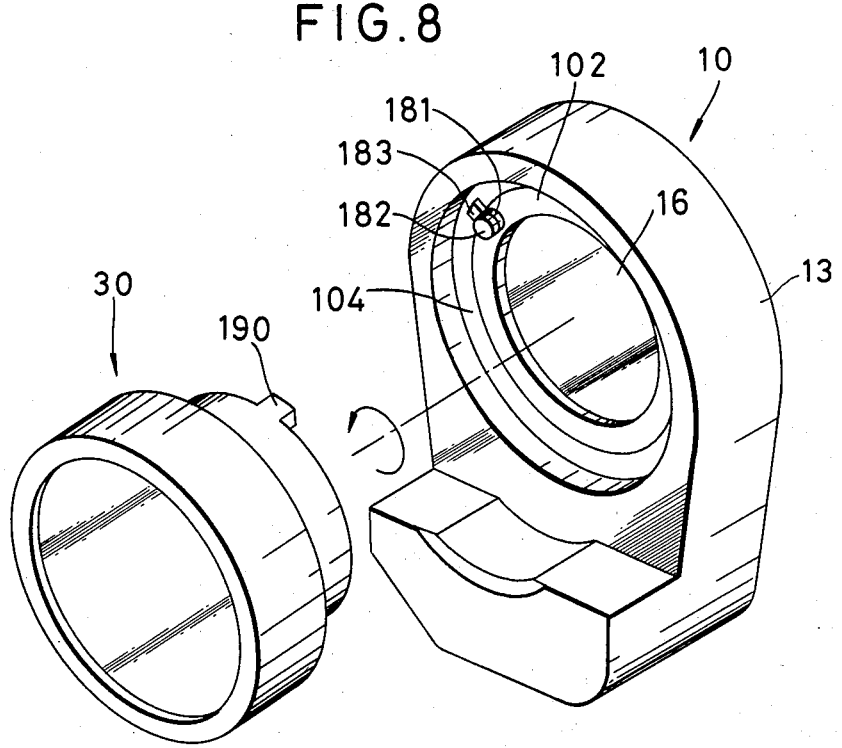
FIG. 8 is a perspective view showing interlocking means on a photographing lens and on an AF unit according to the invention.

FIG. 8 shows another embodiment of the invention which can satisfy the desire mentioned above. In this embodiment, the lens system of the AF unit can be set to the position for infinity automatically in link with an operation for mounting a photographing lens on the AF unit. The term "the position for infinity" used herein means the position which the lens system of the AF unit takes when moved toward the photographing lens side, i.e., the object side, up to the limited end of the moving range.

Referring to FIG. 8, the AF unit 10 has a rotary knob 182 with a projection 183. The knob 182 is supported on a seat ring 181 for rotation about a rotation axis parallel to the optical axis. The seat ring 181 is fixed on the end surface of the ring 102 facing the photographing lens 30. The ring 102 is a ring for holding the lens system 16. Between the seat ring 181 and the knob 182 there is interposed click-stop means (not shown). Under the action of click-stop means the knob 182 is click-stopped at the position shown in FIG. 8 in which the projection 183 projects outwardly over the outer circumference of the ring 102. Furthermore, the knob 182 is under the action of the biasing force of a spring which tends to return the knob to the position shown in FIG. 8 when the knob 182 is rotated relative to the seat ring 181.

On the other hand, the photographing lens 30 has a projection 190 formed on a fixed portion near the mount part of the lens 30 at a suitable position opposite to the AF unit 10. The photographing lens and the AF unit are coupled together by means of bayonet mount members in the manner described above by rotating the photographing lens in the direction of the arrow relative to the AF unit. The length of the projection 190 measured along the optical axis and the diametrical distance of the projection from the optical axis are so selected that the projection 190 can abut against the projection 183 of the knob in the course of the above-mentioned rotation of the photographing lens in the direction of the arrow for coupling.

In the course of the rotation of the photographing lens 30 relative to the AF unit 10, therefore, the projection 190 on the photographing lens comes into contact with the projection 183 on the AF unit and thereafter the knob 182 is forcedly moved together with the ring 102 about the optical axis by the projection 190. At this step of rotation, the click stop prevents the knob 182 from being rotated relative to the seat ring 181. Since the ring 102 is rotated along a helicoid, the ring moves toward the object side along the optical axis while rotating about the optical axis at the same time. The ring 102 is stopped mechanically at the limit end of its moving range on the object side, i.e., at the position for infinity. With a further rotation of the photographing lens 30 relative to the AF unit 10 for coupling, the projection 190 pushes down the projection 183 of the knob against the click stop force and then overrides the projection 183. Immediately after overriding the projection 183, the projection 190 is mechanically stopped and the coupling between the photographing lens 30 and the AF unit 10 is completed. The knob 182 is returned to its starting position shown in FIG. 8 by the bias spring (not shown).

In this manner, according to the second embodiment shown in FIG. 8, the lens system of the AF unit can automatically be set to the position for infinity. When the photographing lens is to be removed from the AF unit, the former is rotated relative to the latter in the opposite direction to the above-shown direction for coupling. Operations during the relative rotation for detachment are obvious from the foregoing.

As a modification of the above embodiment, it is also possible to automatically move the lens system 16 to the position for close-up, that is, the position nearest to the image side, in link with the coupling operation of photographing lens and AF unit. In this case, the AF unit functions as a close-up lens and can cooperate with the photographing lens to focus on a very close object.

Obviously other modifications and changes are possible in the light of the above teachings. The above embodiment may easily be modified to automatically set the lens system 16 to the end position on the object side or on the image side in link with the detaching operation of the photographing lens from the AF unit. Similarly to the above, a pair of projections may be provided on the mount of the camera body and on the end surface of the ring 102 of the AF unit facing the camera body so that the lens system 16 can automatically be set to the end position in link with the operation for coupling the AF unit and camera body or with the operation for detaching the AF unit from the camera body.

I claim:

1. In an automatic focusing unit to be interposed between a photographing lens and a camera body and having a lens system cooperative with the photographing lens to form an image of an object and driving means for moving said lens system in accordance with a detection signal from a focus detector so as to focus said object image on the focal plane, said camera body having a portion to be held by the right hand of the operator in a first direction on a plane perpendicular to the optical axis of said lens system, the improvement comprising:
   (a) a cylindrical member having two ends one of which is connectable with the photographing lens and the other is connectable with the camera body and containing therein the lens system;
   (b) a casing member for covering the outside of said cylindrical member excepting at least the two ends thereof; and
   (c) focus locking means for acting on said driving means to retain the lens system at the position moved by said driving means, said focus locking means including an operation member for disabling said driving means, said operation member being provided on said casing member at such position which lies lower than the optical axis and shifted toward said first direction from the optical axis when the camera body and the automatic focusing unit are held with the optical axis and said first direction extending parallel with the horizontal plane.

2. In an automatic focusing unit to be interposed between a photographing lens and a camera body and having a lens system cooperative with the photographing lens to form an image of an object and driving means for moving said lens system in accordance with a detection signal from a focus detector so as to focus said object image on the focal plane, said camera body having a portion to be held by the right hand of the operator in a first direction on a plane perpendicular to the optical axis of the lens system, the improvement comprising:
   (a) a cylindrical member having two ends one of which is connectable with the photographing lens and the other is connectable with the camera body and containing therein said lens system; and
   (b) a casing member for covering the outside of said cylindrical member excepting at least said two ends thereof, said casing member comprising a first casing part for receiving therein the cylindrical member and a second casing part for providing a space for receiving therein said driving means at a position adjacent to said cylindrical member, said first and second casing parts being so formed that when the automatic focusing unit connected with the camera body is held with the optical axis and said first direction extending parallel to the horizontal plane, said second casing part lies below said first casing part and that said second casing part partly projects toward the object side beyond said first casing part in the direction along the optical axis.

3. An automatic focusing unit according to claim 2, wherein the second casing part has an inclined surface on the side opposite to the first casing part, said inclined surface facing to said first direction and extending in the direction nearly parallel to the optical axis.

4. An automatic focusing unit according to claim 3, wherein said unit further comprises focus locking means for acting on said driving means to stop the lens system at the position moved by said driving means, said focus locking means including an operation member provided on said inclined surface for disabling said driving means.

5. In an automatic focusing unit to be interposed between a photographing lens unit and a camera body and provided with a lens system cooperative with the photographing lens unit to form an image of an object and a mount portion to be engaged and disengaged with a mount member on the photographing lens unit by relative rotation about the optical axis, said lens system being moved by an electric motor in a direction along the optical axis in accordance with a detection signal from a focus detector so as to focus the object image on the focal plane, the improvement comprising:
   operation means responsive to the relative rotation between the mount member and the mount portion for moving the lens system in the direction along the optical axis independently of said electric motor.

6. An automatic focusing unit according to claim 5, wherein said lens system has a predetermined moving range and said operation means brings the lens system up to a position at one end of said moving range.

7. An automatic focusing unit according to claim 6, wherein said operation means brings the lens system up to a position at the object side end of the moving range.

8. An automatic focusing unit according to claim 5, wherein said automatic focusing unit further includes a casing on which said mount portion is formed and a holding member holding said lens system in the casing and capable of moving rotatably about and slidably along the optical axis, and said operation means includes means for rotating said holding member during the relative rotation between the mount member and the mount portion, the last-mentioned means including a rotatable element disposed between the holding member and said casing for rotating the holding member in accordance with the rotation of said element.

9. An automatic focusing unit according to claim 8, wherein said operation means integrally couples said holding member with the mount member with respect to rotational movement during the relative rotation between the mount member and the mount portion.

10. An automatic focusing unit according to claim 8, wherein said operation means includes a screw coupling between said holding member and said casing.

* * * * *